(12) United States Patent
Post, II et al.

(10) Patent No.: US 8,657,389 B2
(45) Date of Patent: Feb. 25, 2014

(54) COOPERATIVE TRACTION CONTROL SYSTEM

(75) Inventors: James W. Post, II, Dublin, OH (US); Theodore Klaus, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 1023 days.

(21) Appl. No.: 11/133,503

(22) Filed: May 20, 2005

(65) Prior Publication Data

US 2005/0258685 A1 Nov. 24, 2005

Related U.S. Application Data (63) Continuation-in-part of application No. 10/983,393, filed on Nov. 8, 2004.

(60) Provisional application No. 60/588,085, filed on Jul. 15, 2004, provisional application No. 60/572,732, filed on May 20, 2004, provisional application No. 60/588,085, filed on Jul. 15, 2004.

(51) Int. Cl.
  *B60T 8/32* (2006.01)

(52) U.S. Cl.
  USPC ............................ 303/142; 303/140; 180/197

(58) Field of Classification Search
  USPC ................ 303/139–142; 701/82–85; 180/197
  See application file for complete search history.

(56) References Cited

U.S. PATENT DOCUMENTS

| | | | |
|---|---|---|---|
| 5,009,294 A | 4/1991 | Ghoneim | |
| 5,471,386 A | 11/1995 | Hrovat et al. | |
| 5,701,247 A | 12/1997 | Sasaki | |
| 5,752,575 A | 5/1998 | Konishi et al. | |
| 5,893,812 A | 4/1999 | Narai et al. | |
| 6,064,930 A | 5/2000 | Shibahata | |
| 6,219,609 B1 * | 4/2001 | Matsuno et al. | 701/72 |
| 6,240,355 B1 * | 5/2001 | Schmitt | 701/84 |
| 6,246,945 B1 * | 6/2001 | Fritz et al. | 701/70 |
| 6,450,281 B1 * | 9/2002 | Kohler et al. | 180/197 |
| 6,766,239 B2 | 7/2004 | Barron et al. | |

FOREIGN PATENT DOCUMENTS

| | | |
|---|---|---|
| DE | 3818511 | 12/1988 |
| DE | 4321571 | 1/1994 |
| DE | 19632939 | 10/1997 |
| DE | 19844467 | 4/1999 |
| DE | 19949220 | 4/2001 |
| FR | 2843079 | 2/2004 |
| GB | 2277813 | 11/1994 |
| JP | 717289 | 1/1995 |
| WO | 9404385 | 3/1994 |

OTHER PUBLICATIONS

Supplementary European Search Report of European Application No. 05752996.8 mailed Dec. 1, 2009.

* cited by examiner

*Primary Examiner* — Bradley King
(74) *Attorney, Agent, or Firm* — Mark E. Duell; Rankin Hill & Clark LLP (57) ABSTRACT

A cooperative traction control system wherein individualized control over each wheel's longitudinal slip and/or lateral skidding is provided. The system uses a combination of an existing traction and stability module linked with a drive torque actuator capable of modulating the amount of drive torque at a given wheel on a specified axle. The system permits drive torque at the slipping and/or laterally skidding wheel to be controlled, either alone or in combination with brake actuation and throttle angle control, to reduce or control wheel slip and/or lateral skid and/or vehicle motion.

1 Claim, 8 Drawing Sheets

COOPERATIVE TRACTION CONTROL SYSTEM

This application is a continuation-in-part of prior U.S. application Ser. No. 10/983,393 filed on Nov. 8, 2004 which claims the benefit of currently pending U.S. Provisional Application 60/588,085 filed on Jul. 15, 2004. This application also claims the benefit of currently pending U.S. Provisional Application Ser. No. 60/572,732 filed on May 20, 2004 and currently pending U.S. Provisional Application 60/588,085 filed on Jul. 15, 2004; the entire disclosures of the preceding two provisional applications are incorporated by reference herein.

BACKGROUND OF THE INVENTION

1. Field of the Invention

The present invention is directed toward a methodology for independent longitudinal wheel slip and lateral skid control utilizing a traction control and a stability control system in cooperation with a drive torque distribution control system capable of individual wheel drive torque modulation.

2. Description of Related Art

A vehicle system may consist of a variety of control actuators (brakes, drive torque distribution, suspension stroke control, tire load control, etc.) capable of modulating the forces at each wheel for the purpose of maintaining traction, achieving vehicle dynamics responses and ensuring vehicle yaw stability. Each actuator is generally driven by it's own, dedicated ECU (electronic control unit) to achieve a specific function. Some actuator ECU's may share status information in order to understand each ECU's operational state, or failure condition.

In the area of traction control leading to stable vehicle response, vehicle stability assist systems or traction control systems usually are based on brake technology and command changes in total system drive torque through engine control (changes in engine torque) and modulation at each individual wheel by brake torque application. In this manner it is possible for the Traction Control System (TCS) or Vehicle Stability Assist (VSA) controller to limit the overall wheel slip and/or lateral skid and to achieve a stable vehicle response.

However, since the control of the total drive torque, as modulated by engine torque control, is not directly related to each wheel's drive torque condition (i.e. an engine torque change affects the overall torque but not specifically an individual wheel drive torque), it has limited effectiveness in terms of simultaneously keeping vehicle momentum and allowing a stable vehicle response while controlling wheel slip and/or lateral skid of an individual wheel.

The TCS and/or VSA controller is usually designed to operate in a slip-based and/or lateral skid-based feedback manner and is usually designed and implemented with high fidelity for this purpose. However, it does not, in the current state of the art, have the capability to modulate individual tractive torques at each wheel through changes in drive torque distribution of the driveline.

The TCS and/or VSA controller, in the current state of the art, has the capability to:
 Calculate a reference vehicle speed;
 Calculate each wheel's traction condition (either longitudinal slip rate or lateral skid);
 Compare to a threshold speed and/or longitudinal slip and/or lateral skid;
 Judge the proximity to a potentially unstable vehicle motion; and,
 Calculate a required application torque (usually brake) to control wheel spin and/or wheel lateral skid and/or vehicle motion.

It has been found that the conventional TCS or VSA operation has limited ability to respond to operation on low coefficient surfaces during turning and hard acceleration. During vehicle launch on low coefficient surfaces and while turning in particular, there is a higher likelihood of loss of traction and potentially ensuing loss of yaw stability and/or vehicle maneuverability.

In these types of events, the current state of the art in traction control systems reduces engine torque in addition to applying brakes to the slipping and/or laterally skidding wheel(s) to control the vehicle motions, wheel slips and lateral skids. This usually results in a hesitation to the overall vehicle momentum because the amount of engine torque reduction required to reduce the most critical wheel slip and/or lateral skid also reduces the amount of tractive effort on other wheels that may not be in an excessive slip and/or lateral skid situation and may even have additional traction capability. This hesitation may, in some cases, be detrimental and could lead to problems in some situations, such as hill climbing or operation in tightly confined spaces where acceleration is requested but not delivered due to this hesitation.

Therefore, there exists a need in the art for an improved traction control type system, wherein reduction in engine torque is prevented, if possible, or delayed, and wherein drive torque provided to a slipping and/or laterally skidding wheel is reduced, so as to better match the traction conditions being experienced by the vehicle, thereby providing better handling, especially during low speed, tight turn acceleration on low coefficient of friction surfaces.

SUMMARY OF THE INVENTION

The present invention is directed toward a cooperative traction control system wherein the drive torque applied to the wheels is individually controlled or modulated to react to sensed wheel-slipping conditions and/or sensed wheel lateral skidding, so as to provide better handling and vehicle response, especially during low speed, tight-turn acceleration on surfaces having a relatively low coefficient of friction.

According to the present invention, individual control of a vehicle's wheel slip and/or lateral skid or potential wheel slip and/or lateral skid is provided by using the combination of an existing TCS control module and/or an existing VSA control module linked with a drive torque actuator capable of modulating the amount of drive torque at a given wheel on a specified axle.

The system according to the present invention includes a group of vehicle parameter sensors including wheel speed sensors for each wheel and vehicle motion sensors (including but not limited to yaw rate sensors, lateral acceleration sensors, longitudinal acceleration sensors, and steering angle sensors). The system also includes a controllable suspension including load sensing capabilities, a traction control system electronic control unit (hereinafter TCS ECU) a vehicle stability system electronic control unit (hereinafter VSA ECU) used in combination with or as an alternative to the TCS ECU, a drive torque actuator associated with each of the wheels, a drive torque controller electronic control unit (hereinafter drive torque ECU), and an engine electronic control unit (hereinafter engine ECU) that is operable to control operation of the engine, namely the throttle angle, to affect engine output torque. The TCS ECU, VSA ECU, drive torque ECU, and engine ECU preferably are in electrical communication with one another via a communications bus.

The cooperative traction control system is described below in the alternative, utilizing either a TCS ECU alone to remedy longitudinal wheel slip conditions or a VSA ECU alone to remedy lateral skid and other vehicle instability conditions or in a third configuration, that is a preferred configuration, utilizing both the TCS ECU and VSA ECU together.

The TCS ECU and VSA ECU receive signals from the wheel speed sensors and from other vehicle parameter sensors in the vehicle and determine, based upon predetermined control algorithms, whether one or more of the wheels is either slipping and/or skidding laterally (feedback-based control) or about to slip and/or skid laterally (feed-forward based control) or if the vehicle is progressing into a region of unstable motion. The TCS ECU and/or VSA ECU calculate the necessary wheel brake torque (or actuation force), the necessary throttle angle adjustment, and the necessary drive torque reduction amount for the slipping and/or laterally skidding wheel(s).

The TCS ECU and/or VSA ECU is in communication with the brakes for each wheel, and with the drive torque ECU and the engine ECU. The drive torque ECU is in communication with the individual drive torque actuators. In accordance with the present invention, there are several ways to implement the improved cooperative traction control made possible by independently controlling the individual drive torques for each of the wheels.

In a second embodiment of the present invention, the controllable suspension and associated load sensors are used to determine potential wheel slippage and/or lateral skid while in a primary or first embodiment, the controllable suspension is not present.

In a first method of the first preferred embodiment of the present invention, the cooperative traction control system provides a staged or sequential control wherein, when it is determined that a wheel is slipping or skidding laterally or the vehicle is progressing into a region of unstable motion, the TCS ECU and/or VSA ECU communicates the necessary drive torque reduction amount to the drive torque ECU, which, in turn, activates the associated drive torque actuator for the slipping and/or laterally skidding wheel to reduce the drive torque applied to the slipping and/or laterally skidding wheel. Should it be determined that the subject wheel continues to slip and/or skid laterally or that the vehicle continues to progress into a region of unstable motion, then the TCS ECU and/or VSA ECU modulates or activates the brakes at each wheel, further reducing the wheel speed. Should it be determined that the subject wheel continues to slip and/or skid laterally or that the vehicle continues to progress into a region of unstable motion, then the TCS ECU and/or VSA ECU communicates a throttle angle change request to the engine ECU, which adjusts the throttle angle to produce the desired torque output reduction.

In a second method of the first preferred embodiment of the present invention, the cooperative traction control system provides a staged or sequential control wherein, when it is determined that a wheel is slipping and/or skidding laterally or the vehicle is progressing into a region of unstable motion, the TCS ECU and/or VSA ECU communicates the necessary drive torque reduction amount to the drive torque ECU, which, in turn, activates the associated drive torque actuator for the slipping and/or laterally skidding wheel to reduce the drive torque applied to the slipping and/or laterally skidding wheel. Should it be determined that the subject wheel continues to slip or skid laterally or that the vehicle continues to progress into a region of unstable motion, then the TCS ECU and/or VSA ECU communicates a throttle angle change request to the engine ECU, which adjusts the throttle angle to produce the desired torque output reduction. Should it be determined that the subject wheel continues to slip and/or skid laterally or the vehicle continues to progress into a region of unstable motion, then the TCS ECU and/or VSA ECU modulates or activates the brakes at each wheel, further reducing the wheel speed.

In further accordance with the present invention, a third method of the first preferred embodiment for controlling the cooperative traction control system is provided wherein the severity of wheel slip and/or lateral skid and/or progression of the vehicle into a region of unstable motion is determined by the TCS ECU and/or VSA ECU and the remedial measures undertaken correspond to the anticipated magnitude of the wheel slippage and/or lateral skid and/or vehicle motion. For example, should it be determined that a very severe wheel slip and/or lateral skid and/or progression into an unstable region of vehicle motion has occurred or is about to occur, the TCS ECU and/or VSA ECU will respond by simultaneously: activating the associated drive torque actuator (via the drive torque ECU), reducing the engine output torque (by sending a throttle angle change request to the engine ECU), and applying or modulating the brakes on each of the wheels. Should a relatively less severe slipping and/or laterally skidding condition and/or progression of the vehicle into a region of unstable vehicle motion be experienced or anticipated by the TCS ECU and/or VSA ECU, the remedial measures may be correspondingly reduced. For example, in a moderate sensed or anticipated slipping and/or laterally skidding and/or unstable vehicle situation, the TCS ECU and/or VSA ECU may respond by simultaneously: activating the associated drive torque actuator (via the drive torque ECU), and applying or modulating the brakes on each of the wheels. In this way, for less severe sensed or anticipated wheel slipping and/or laterally skidding and/or unstable vehicle situations, the engine output torque is maintained, which permits the vehicle handling and speed to be maintained or restored quickly when the slipping and/or laterally skidding and/or unstable vehicle conditions are removed. Also, should a minor slipping and/or laterally skidding and/or unstable vehicle condition be experienced or anticipated, then the TCS ECU and/or VSA ECU may respond by only activating the associated drive torque actuator via the drive torque ECU. In many cases, this reduction in drive torque at only the slipping and/or laterally skidding wheel will alleviate the slipping and/or laterally skidding and/or unstable vehicle motion problem before a more severe slipping and/or laterally skidding and/or unstable vehicle condition is experienced and without detrimentally affecting the performance of the vehicle.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

This invention combines the basic functions of a feed-forward drive torque actuator with the control of a slip-based and/or lateral skid-based and/or vehicle motion-based feed-back brake and throttle control system. According to the present invention, the cooperative traction control system now is capable of requesting drive torque changes at each wheel via a controlled drive torque actuator.

Figure 1:
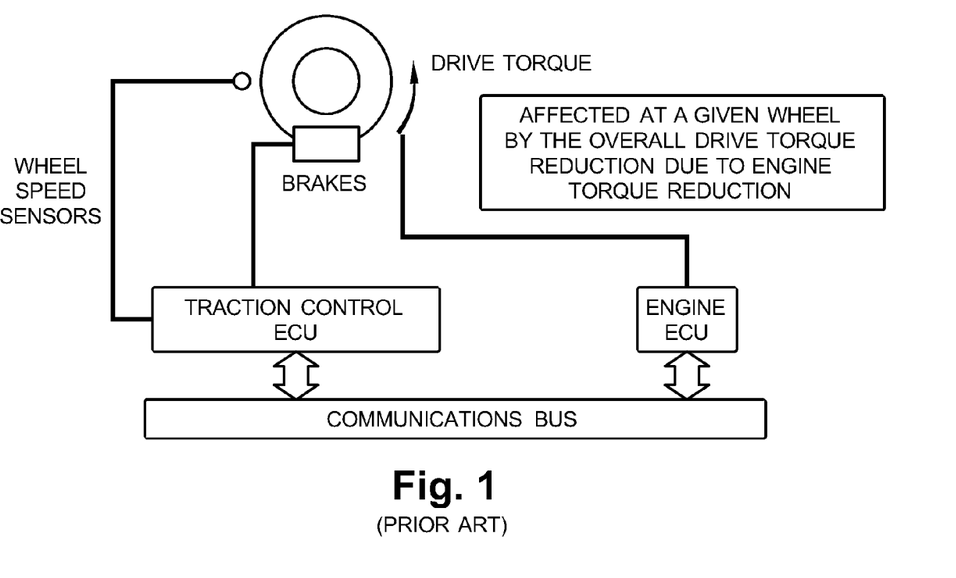
FIG. 1 is a schematic representation of a conventional traction control system; and, FIG. 2a is a schematic representation of a cooperative traction control system according to a first embodiment of the present invention.
Figure 2A:
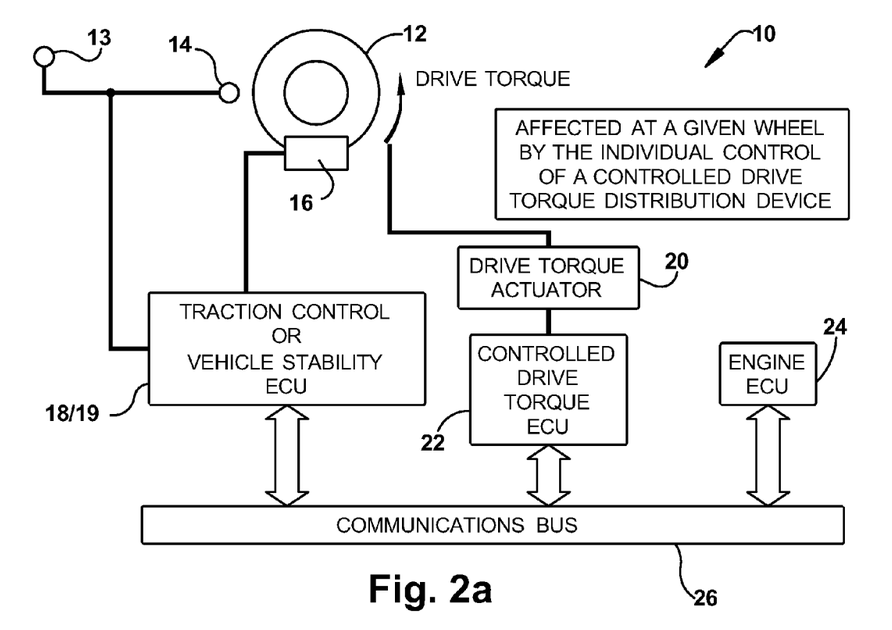
Figure 2B:
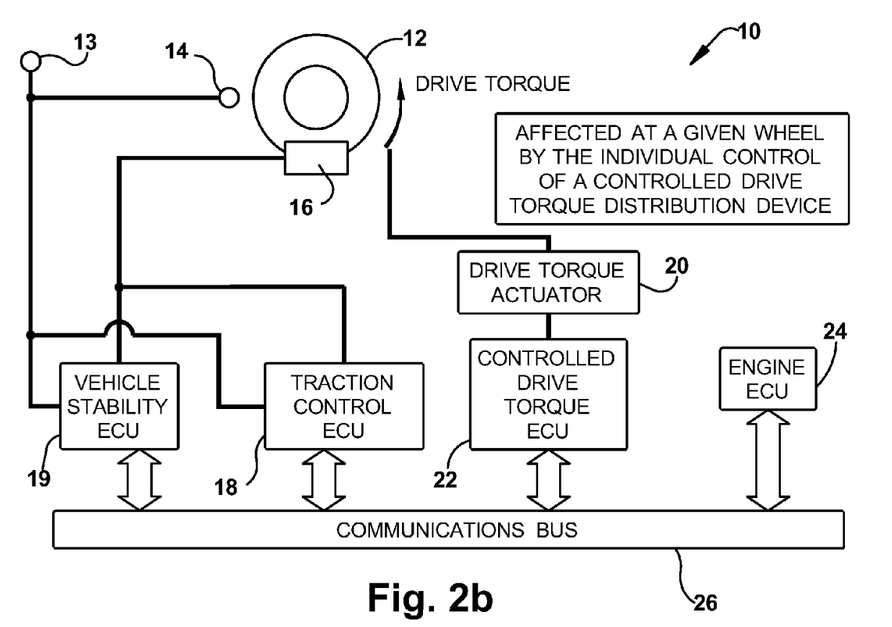
FIG. 2b is a schematic representation of a cooperative traction control system according to an alternate first embodiment of the present invention.

With reference to FIGS. 2a and 2b, a cooperative traction control system 10 according to the present invention is illustrated. The cooperative traction control system 10 is installed on a vehicle having a plurality of wheels 12 and includes vehicle parameter sensors comprising wheel speed sensors 14, and/or vehicle motion sensors 13 (vehicle motion sensors including but not limited to yaw rate, lateral acceleration, longitudinal acceleration, steering angle). The cooperative traction control system also includes brakes 16 associated with each wheel 12, a TCS ECU 18, a VSA ECU 19 used in combination with (FIG. 2b) or as an alternative to (FIG. 2a) the TCS ECU 18 a drive torque actuator 20 associated with each of the wheels 12, a drive torque ECU 22, an engine ECU 24, and a communications bus 26.

The TCS ECU 18 and/or VSA ECU 19 is in communication with the brakes 16 of each wheel 12 (i.e., the brake actuators), and with the drive torque ECU 22 and the engine ECU 24 via the communications bus 26, as illustrated.

The TCS ECU 18 and/or VSA ECU 19 receives signals from the wheel speed sensors 14 and/or vehicle motion sensors 13, and uses these signals to determine wheel speed changes and vehicle motions. The wheel speed changes and vehicle motions are compared to stability operational boundaries in the TCS ECU 18 and/or VSA ECU 19 to determine whether one or more wheels 12 are slipping and/or skidding laterally, or about to slip and/or skid laterally and/or whether the vehicle is progressing into a region of unstable motion, and whether the actual or anticipated wheel slip and/or lateral skid needs to be reduced. It is noted that many algorithms are known in the art to qualify and quantify wheel slip and/or lateral skid and/or stable vehicle motion and that many of these known algorithms may be used by the TCS ECU 18 and/or VSA ECU 19.

The TCS ECU 18 and/or VSA ECU 19 uses the wheel slip and/or lateral skid and/or vehicle motion information either alone or in combination with other sensed conditions (i.e., steering angle, temperature, pitch/yaw) to calculate control signals that may be used to control operation of the vehicle drive/brake systems to correct the wheel slip and/or lateral wheel skid and/or vehicle motion, as described hereinafter. More specifically, the TCS ECU 18 and/or VSA ECU 19 calculates: a drive torque reduction amount that may be communicated to the drive torque ECU 22 to control the drive torque actuator(s) 20; a brake torque (braking force) that may be communicated to each of the brakes 16 to modulate/actuate the brakes; and, a throttle angle change request that may be communicated to the engine ECU 24 to control operation of the engine. In this regard it is noted that the condition or position of the throttle is communicated from the engine ECU 24 to the TCS ECU 18 and/or VSA ECU 19 via the communications bus 26, and that the condition of the individual drive torque actuators 20 is communicated from the drive torque ECU 22 to the TCS ECU 18 and/or VSA ECU 19.

The drive torque ECU 22 receives drive torque reduction signals from the TCS ECU 18 and/or VSA ECU 19 and controls operation of the individual drive torque actuators 20. The drive torque actuators 20 are generally designed and intended to achieve an appropriate level of drive torque for each wheel 12 as required by the prevailing vehicle condition, and may have their own feed-forward and feed-back control. However, as surface, loading, speed and other vehicle conditions change, there is an opportunity to have individual wheel slip and/or lateral skid that leads to loss of traction and/or even loss of vehicle stability or maneuverability. Therefore, control over the individual drive torque actuators 20 via the TCS ECU 18 and/or VSA ECU 19 and the drive torque ECU 22 is preferably employed, as should be apparent from the present discussion.

The engine ECU 24 is adapted to control or adjust the throttle and thereby affects the engine output torque. The engine ECU 24 receives the throttle angle change request signals from the TCS ECU 18 and/or VSA ECU 19 and implements adjustments to the throttle angle, and communicates the throttle angle status to the TCS ECU 18 and/or VSA ECU 19.

Figure 3:
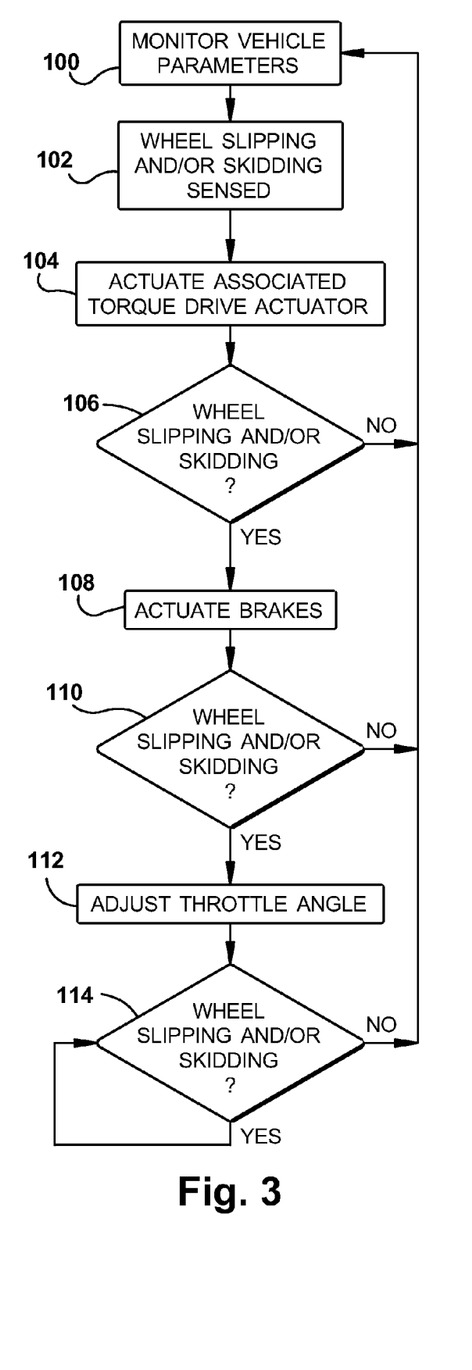
FIG. 3 is a flow chart illustrating operational steps of a first method according to the first embodiments of the present invention.

With reference to FIG. 3, a flow chart illustrating a first preferred method of operating the first embodiment of the cooperative traction control system 10 according to the present invention is provided. In this embodiment the cooperative traction control system provides a staged actuation of control systems to reduce wheel slip and/or lateral skid, as necessary.

In step 100, the wheels and vehicle motions are monitored and, in step 102, it is determined that a wheel is slipping and/or skidding laterally and/or the vehicle is progressing into or operating in a region of unstable motion. Thereafter, in step 104, the TCS ECU 18 and/or VSA ECU 19 communicates the necessary drive torque reduction amount to the drive torque ECU 22, which, in turn, activates the associated drive torque actuator 20 for the slipping and/or laterally skidding wheel to reduce the drive torque applied to the slipping and/or laterally skidding wheel. The slipping and/or lateral skidding condition of the wheels is sensed (step 106) and, should it be determined that the subject wheel continues to slip and/or skid laterally or that the vehicle continues to progress into or operate in a region of unstable motion, then the TCS ECU 18 and/or VSA ECU 19 modulates or activates the brakes 16 at each wheel 12 (step 108), further reducing the wheel speed. The wheel slipping and/or laterally skidding and/or vehicle motion condition is further sensed (step 110) and, should it be determined that the subject wheel continues to slip and/or skid laterally or that the vehicle continues to progress into or operate in a region of unstable motion, then the TCS ECU 18 and/or VSA ECU 19 communicates the throttle angle change request to the engine ECU 24, which adjusts the throttle angle to reduce the engine torque output (step 112). The slipping and/or lateral skid and/or vehicle motion condition is further monitored (step 114) and the control is applied until excessive slipping and/or lateral skid and/or undesirable vehicle motion is no longer sensed or anticipated.

Figure 4:
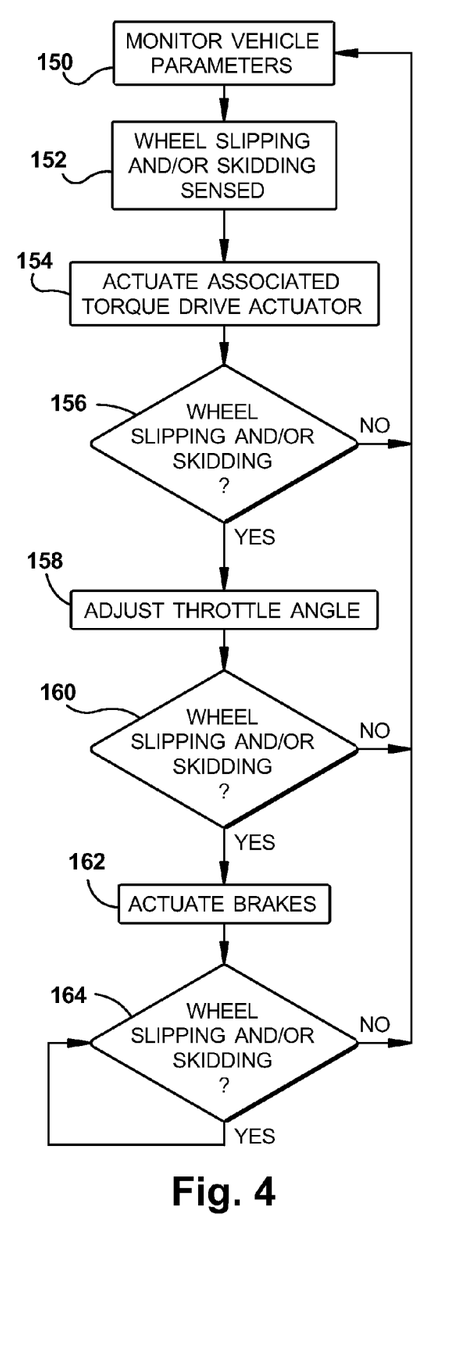
FIG. 4 is a flow chart illustrating operational steps according to a second method according the first embodiments of the present invention.

With reference to FIG. 4, a flow chart illustrating a second preferred method of operating the cooperative traction control system 10 according to a first embodiment of the present invention is provided. This embodiment is similar to the embodiment of FIG. 3, but reverses the order of the sequential application of remedial measures, as will be apparent from the following discussion.

In step 150, the wheels and vehicle motions are monitored and, in step 152 it is determined that a wheel is slipping and/or skidding laterally and/or the vehicle is progressing into or operating in a region of unstable motion. Thereafter, in step 154, the TCS ECU 18 and/or VSA ECU 19 communicates the necessary drive torque reduction amount to the drive torque ECU 22, which, in turn, activates the associated drive torque actuator 20 for the slipping and/or laterally skidding wheel to reduce the drive torque applied to the slipping and/or laterally skidding wheel. The wheel slipping and/or lateral skid and/or vehicle motion condition is further sensed (step 156) and, should it be determined that the subject wheel continues to slip and/or skid laterally or the vehicle continues to progress into or operate in a region of unstable motion, then the TCS ECU 18 and/or VSA ECU 19 communicates the throttle angle change request to the engine ECU 24, which adjusts the throttle angle to reduce the engine torque output (step 158). The slipping and/or lateral skid condition of the wheels is sensed (step 160) and, should it be determined that the subject wheel continues to slip and/or skid laterally and/or the vehicle continues to progress into or operate in a region of unstable motion, then the TCS ECU 18 and/or VSA ECU 19 modulates or activates the brakes 16 at each wheel 12 (step 162), further reducing the wheel speed. The slipping and/or lateral skid and/or vehicle motion condition is further monitored (step 164) and the control is applied until excessive slipping and/or lateral skid and/or undesirable vehicle motion is no longer sensed or anticipated.

Figure 5:
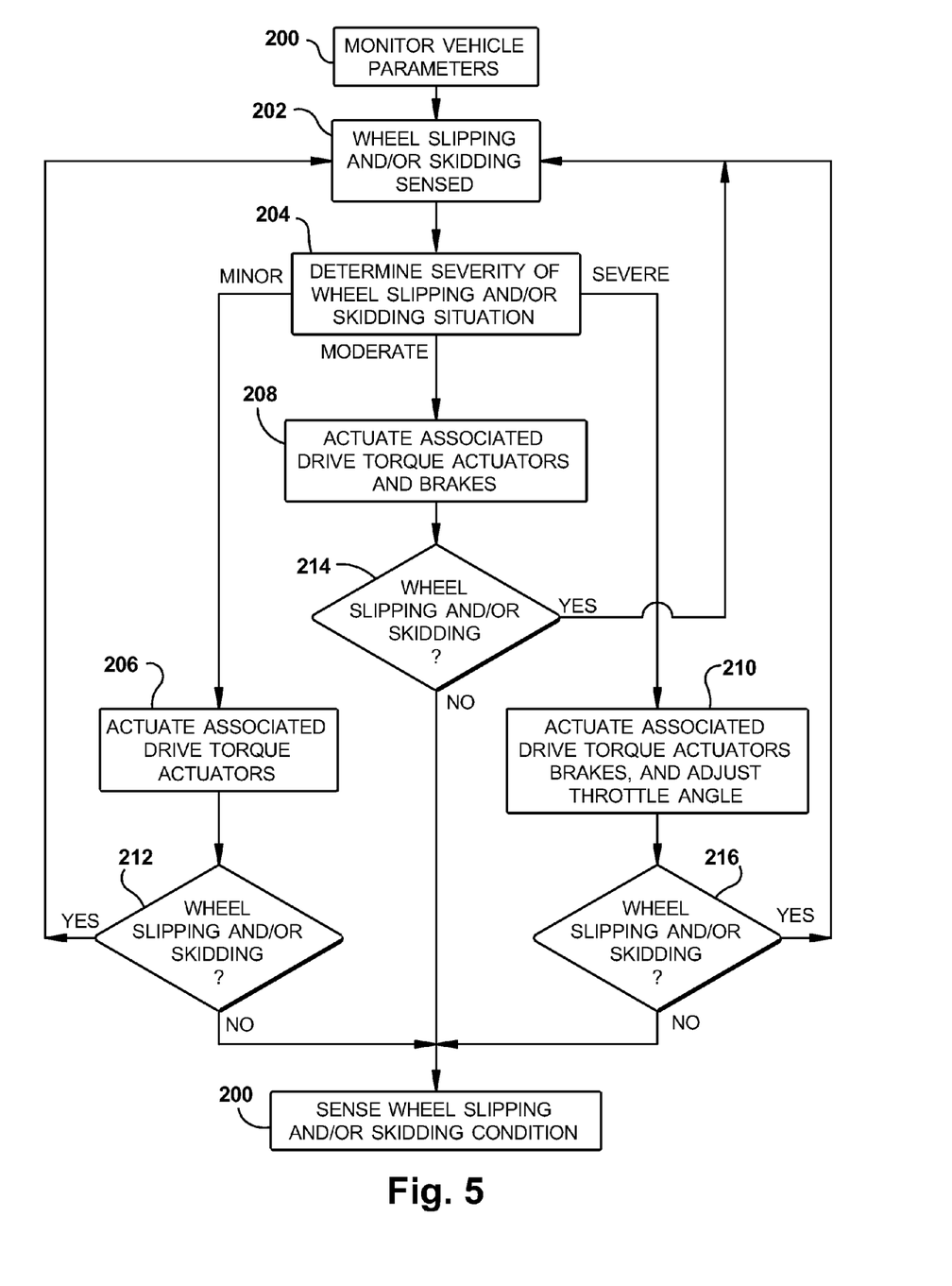
FIG. 5 is a flow chart illustrating operational steps according to a third method of the first embodiments of the present invention.

With reference to FIG. 5, a flow chart illustrating another preferred method of operating the cooperative traction control system 10 according to a first embodiment of the present invention is provided. In this embodiment, the cooperative traction control system 10 provides remedial measures based upon the sensed or calculated severity of the wheel slippage and/or lateral skid and/or undesirable vehicle motion.

In step 200, the wheels and/or vehicle motions are monitored and, should wheel slipping and/or lateral skid and/or undesirable vehicle motion be sensed or anticipated (step 202), the TCS ECU 18 and/or VSA ECU 19 determines the severity of the sensed or anticipated wheel slippage and/or lateral skid and/or undesirable vehicle motion (step 204). If the wheel slipping and/or lateral skid and/or vehicle motion situation is determined to be minor in step 204, then the associated drive torque actuator(s) 20 is activated (step 206). If the wheel slipping and/or lateral skid and/or vehicle motion situation is determined to be moderate in step 204, then the associated drive torque actuator(s) 20 and the brakes are simultaneously activated (step 208). If the wheel slipping and/or lateral skid and/or vehicle motion situation is determined to be severe in step 204, then simultaneously the associated drive torque actuators 20 are activated, the brakes are activated, and the throttle angle is adjusted to reduce engine torque output (step 210). Naturally, following any of the remedial steps (steps 206, 208, 210) the wheel slipping and/or lateral skid and/or vehicle motion condition is sensed (steps 212, 214, 216) and, if acceptable slipping and/or lateral skid and/or vehicle motion is occurring or anticipated, the wheel and/or vehicle motion condition is monitored (step 200). If wheel slipping and/or lateral skid and/or progression into or operating in a region of unstable motion continues or is anticipated, the control returns to determine the severity of the slippage and/or lateral skid and/or undesirable vehicle motion so that the appropriate remedial measure can be selected (i.e., which of steps 206, 208, 210 is to be implemented).

In this way, for minor or moderate sensed or anticipated wheel slipping and/or lateral skid situations, the engine output torque is maintained, which permits the vehicle handling and speed to be maintained or restored quickly when the excessive slipping and/or lateral skid conditions are removed. Also, should a minor slipping and/or lateral skid condition be experienced or anticipated (i.e., one that is close to the threshold of TCS and/or VSA activation), then the TCS ECU and/or VSA ECU 19 may respond by only activating the associated drive torque actuator via the drive torque ECU. In many cases, this reduction in drive torque at only the slipping and/or laterally skidding wheel will alleviate the slipping and/or laterally skidding problem before a more severe slipping and/or laterally skidding condition is experienced and without detrimentally affecting the performance of the vehicle. Naturally, it is considered apparent that the remedial measures for moderate slipping and/or laterally skidding situations may be adjusted or altered so that, instead of applying the brakes, the throttle angle is adjusted. It is believed that reducing drive torque and adjusting the throttle angle in moderate slipping and/or laterally skidding situations may be preferred in some control strategies.

Figure 6A:
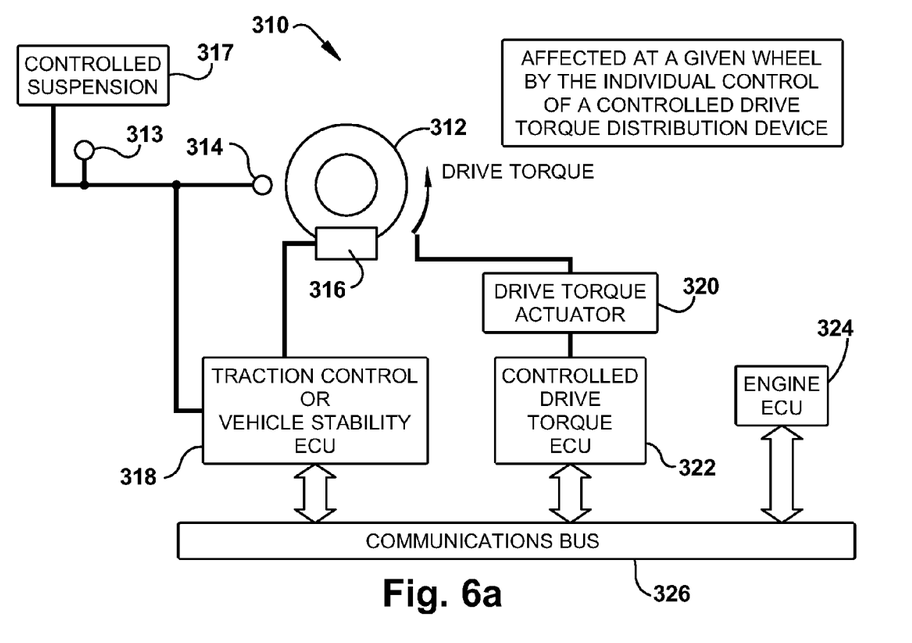
FIG. 6a is a schematic representation of a cooperative traction control system according to a second embodiment of the present invention.
Figure 6B:
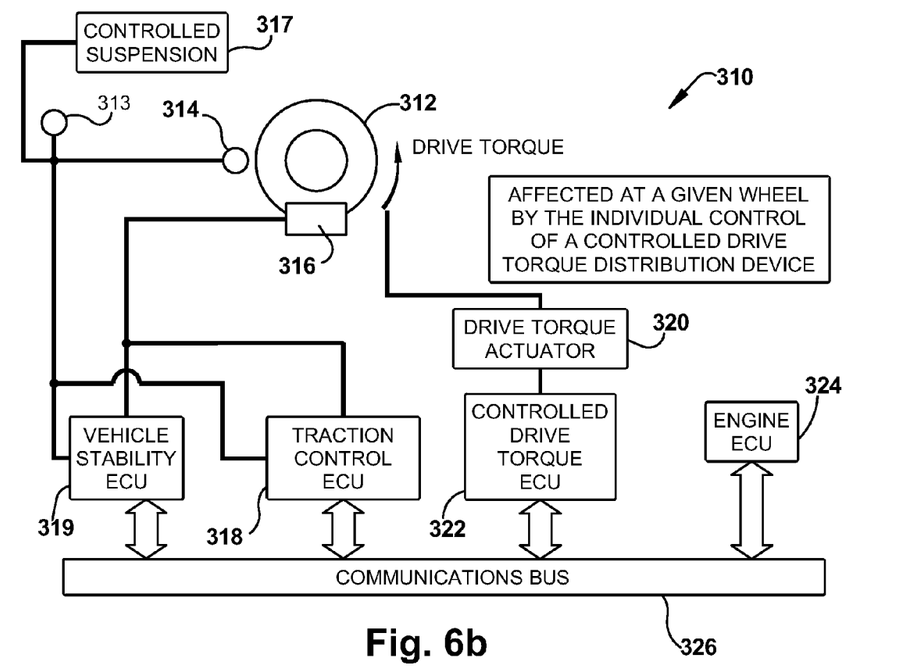
FIG. 6b is a schematic representation of a cooperative traction control system according to an alternate second embodiment of the present invention.

With reference to FIGS. 6a and 6b, a cooperative traction control system 310 according to a second embodiment of the present invention is illustrated. The cooperative traction control system 310 is installed on a vehicle having a plurality of wheels 312 and vehicle parameter sensors including wheel speed sensors 314, and/or vehicle motion sensors 313 (typically yaw rate, lateral g, longitudinal G, and steering angle). The cooperative traction control system 310 also includes brakes 316 associated with each wheel 312, a TCS ECU 318 and/or VSA ECU 319, a drive torque actuator 320 associated with each of the wheels 312, a drive torque ECU 322, an engine ECU 324, a communications bus 326, and a controllable suspension 317 that determines individual wheel loads.

The TCS ECU 318 and/or VSA ECU 319 is in communication with the brakes 316 of each wheel 312 (i.e., the brake actuators), and with the drive torque ECU 322 and the engine ECU 324 via the communications bus 326, as illustrated.

The TCS ECU 318 and/or VSA ECU 319 receives signals from the wheel speed sensors 314, and/or vehicle motion sensors and uses these signals to determine wheel speed changes and vehicle motion changes. The wheel speed changes and vehicle motion changes are compared to stability operational boundaries in the TCS ECU 318 and/or VSA ECU 319 to determine whether one or more wheels 312 are slipping and/or skidding laterally or about to slip and/or skid laterally, or if the vehicle is progressing into a region of unstable motion and whether the actual or anticipated wheel slip and/or lateral skid needs to be reduced. It is noted that many algorithms are known in the art to qualify and quantify wheel slip and/or lateral skid and/or unstable vehicle motion and that many of these known algorithms may be used by the TCS ECU 318 and/or VSA ECU 319.

The TCS ECU 318 and/or VSA ECU 319 also receives signals from the controllable suspension 317 on the vehicle. The controllable suspension 317 determines or calculates individual wheel loads from a vehicle in motion. The controllable suspension 317 includes variable damping control in combination with non-controlled spring force components. The wheel loads are compared to stability operational boundaries in the TCS ECU 318 and/or VSA ECU 319 to determine whether one or more wheels 312 are about to slip and/or skid laterally or if the vehicle is progressing into a region of unstable motion, and whether the anticipated wheel slip and/or lateral skid needs to be reduced. Again, many algorithms are known in the art to qualify and quantify potential wheel slip and/or lateral skid and/or unstable vehicle motion, and that many of these known algorithms may be used by the TCS ECU 318 and/or VSA ECU 319. Alliteratively, the TCS ECU 318 and/or VSA ECU 319 uses the suspension load information in combination with wheel slip and/or lateral skid and/or vehicle motion information and other sensed conditions as described below.

The TCS ECU 318 and/or VSA ECU 319 uses the wheel slip and/or lateral skid information either alone or in combination with other sensed conditions (i.e., steering angle, temperature, pitch/yaw) to calculate control signals that may be used to control operation of the vehicle drive/brake systems to correct the wheel slip and/or lateral skid, as described hereinafter. More specifically, the TCS ECU 318 and/or VSA ECU 319 calculates: a drive torque reduction amount that may be communicated to the drive torque ECU 322 to control the drive torque actuator(s) 320; a brake torque (braking force) that may be communicated to each of the brakes 316 to modulate/actuate the brakes; and, a throttle angle change request that may be communicated to the engine ECU 324 to control operation of the engine. In this regard it is noted that the condition or position of the throttle is communicated from the engine ECU 324 to the TCS ECU 318 and/or VSA ECU 319 via the communications bus 326, and that the condition of the individual drive torque actuators 320 is communicated from the drive torque ECU 322 to the TCS ECU 318 and/or VSA ECU 319.

The drive torque ECU 322 receives drive torque reduction signals from the TCS ECU 318 and/or VSA ECU 319 and controls operation of the individual drive torque actuators 320. The drive torque actuators 320 are generally designed and intended to achieve an appropriate level of drive torque for each wheel 312 as required by the prevailing vehicle condition, and may have their own feed-forward and feed-back control. However, as surface, loading, speed and other vehicle conditions change, there is an opportunity to have individual wheel slip and/or lateral skid that leads to loss of traction and/or even loss of vehicle stability or maneuverability. Therefore, control over the individual drive torque actuators 320 via the TCS ECU 318 and/or VSA ECU 319 and the drive torque ECU 322 is preferably employed, as should be apparent from the present discussion.

The engine ECU 324 is adapted to control or adjust the throttle and thereby affects the engine output torque. The engine ECU 324 receives the throttle angle change request signals from the TCS ECU 318 and/or VSA ECU 319 and implements adjustments to the throttle angle, and communicates the throttle angle status to the TCS ECU 318 and/or VSA ECU 319.

Figure 7:
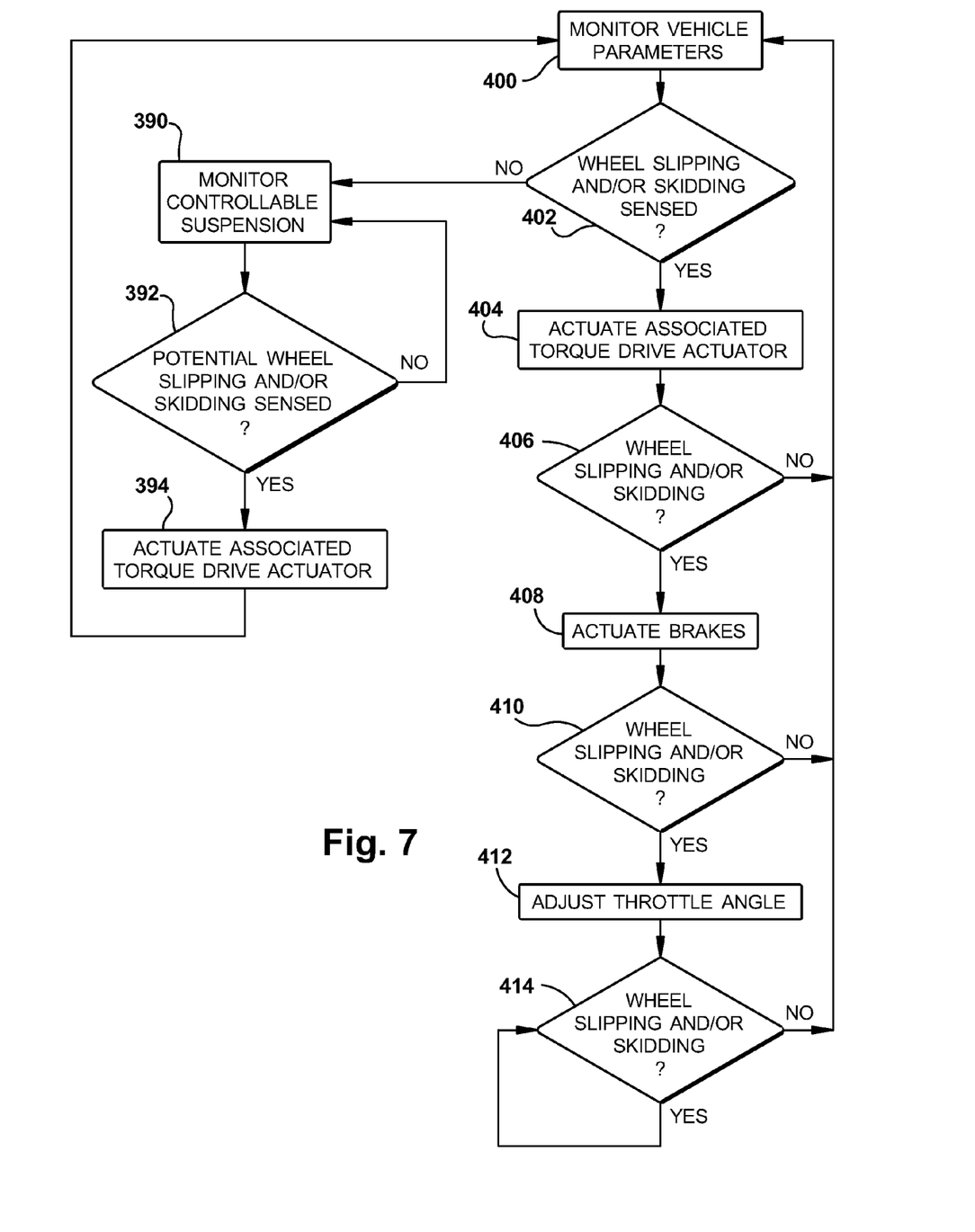
FIG. 7 is a flow chart illustrating operational steps of a first method according to the second embodiments of the present invention.

With reference to FIG. 7, a flow chart illustrating a first preferred method of operating the cooperative traction control system 310 according to the second embodiment of the present invention is provided. In this method the cooperative traction control system provides a staged actuation of control systems to reduce potential wheel slip and/or lateral skid and actual wheel slip and/or lateral skid, as necessary.

In step 390, the controllable suspension is monitored and, in step 392, it is determined that potential wheel slipping and/or lateral skidding is occurring. Thereafter, in step 394, the TCS ECU 118 and/or VSA ECU 319 communicates the necessary drive torque reduction amount to the drive torque ECU 122, which, in turn, activate the associated drive torque actuator 120 for the wheel that is about to slip and/or skid laterally to reduce the drive torque applied to that wheel.

In step 400, the wheels and vehicle motions are monitored and, in step 402, it is determined that a wheel is slipping and/or laterally skidding and/or the vehicle is progressing into a region of unstable motion. Thereafter, in step 404, the TCS ECU 318 and/or VSA ECU 319 communicates the necessary drive torque reduction amount to the drive torque ECU 322, which, in turn, activates the associated drive torque actuator 320 for the slipping and/or laterally skidding wheel to reduce the drive torque applied to the slipping and/or laterally skidding wheel. The slipping and/or laterally skidding condition of the wheels is sensed (step 406) and, should it be determined that the subject wheel continues to slip and/or skid laterally, then the TCS ECU 318 and/or VSA ECU 319 modulates or activates the brakes 316 at each wheel 312 (step 408), further reducing the wheel speed. The wheel slipping and/or lateral skid condition is further sensed (step 410) and, should it be determined that the subject wheel continues to slip and/or skid laterally, then the TCS ECU 318 and/or VSA ECU 319 communicates the throttle angle change request to the engine ECU 324, which adjusts the throttle angle to reduce the engine torque output (step 412). The slipping condition is further monitored (step 414) and the control is applied until excessive slipping and/or laterally skidding is no longer sensed or anticipated.

Figure 8:
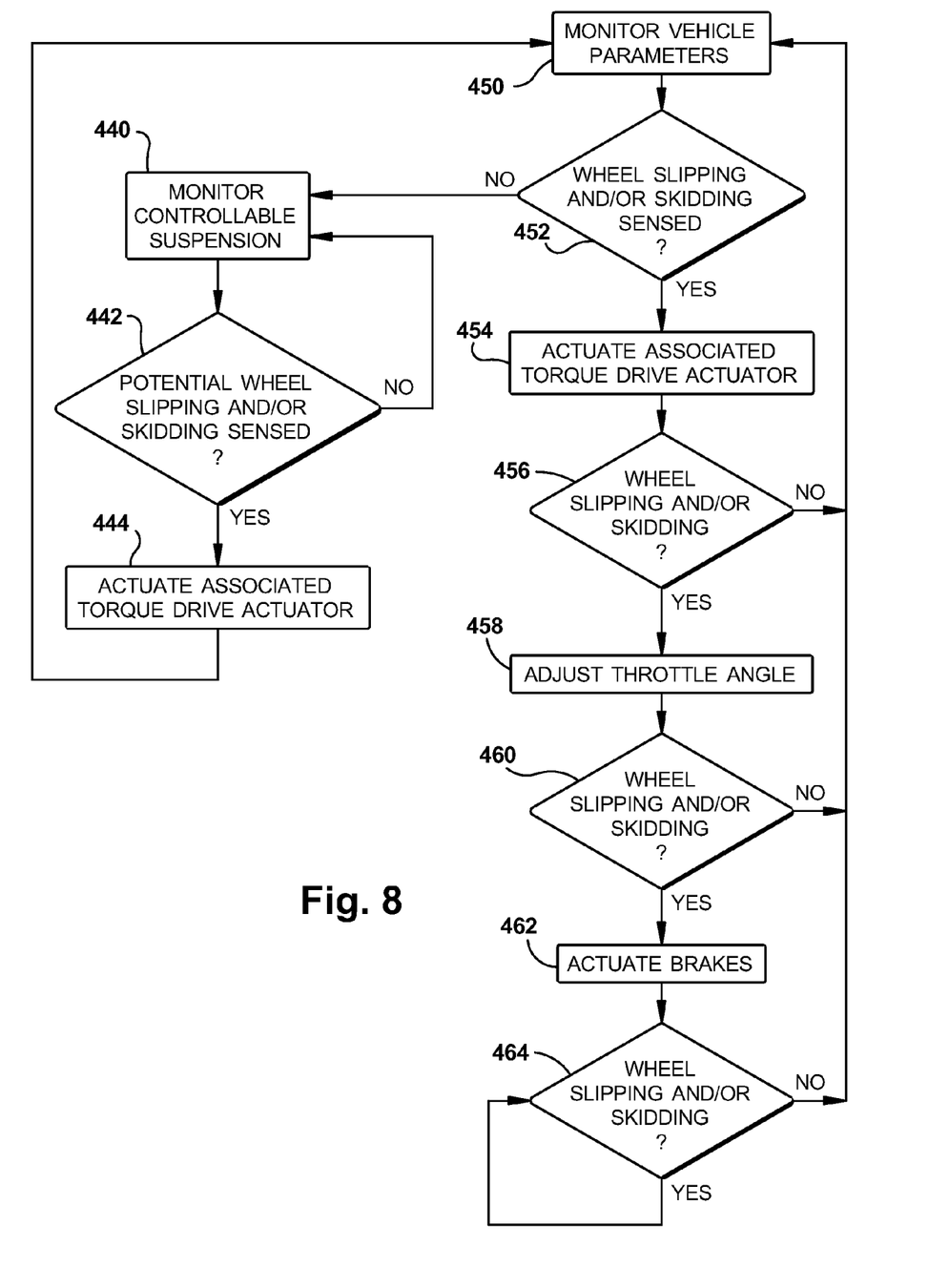
FIG. 8 is a flow chart illustrating operational steps according to a second method according the second embodiments of the present invention.

With reference to FIG. 8, a flow chart illustrating a second preferred method of operating the cooperative traction control system 310 according to the second embodiment of the present invention is provided. This embodiment is similar to the embodiment of FIG. 7, but reverses the order of the sequential application of remedial measures when actual wheel slipping and/or lateral skidding is detected, as will be apparent from the following discussion.

In step 440, the controllable suspension is monitored and, in step 442, it is determined that potential wheel slipping and/or lateral skidding is occurring. Thereafter, in step 444, the TCS ECU 318 and/or VSA ECU 319 communicates the necessary drive torque reduction amount to the drive torque ECU 322, which, in turn, activate the associated drive torque actuator 320 for the wheel that is about to slip and/or skid laterally to reduce the drive torque applied to that wheel.

In step 450, the wheels and vehicle motions are monitored and, in step 452 it is determined that a wheel is slipping and/or skidding laterally. Thereafter, in step 454, the TCS ECU 318 and/or VSA ECU 319 communicates the necessary drive torque reduction amount to the drive torque ECU 322, which, in turn, activates the associated drive torque actuator 320 for the slipping and/or laterally skidding wheel to reduce the drive torque applied to the slipping and/or laterally skidding wheel. The wheel slipping and/or lateral skid condition is further sensed (step 456) and, should it be determined that the subject wheel continues to slip and/or skid laterally, then the TCS ECU 318 and/or VSA ECU 319 communicates the throttle angle change request to the engine ECU 324, which adjusts the throttle angle to reduce the engine torque output (step 458). The slipping and/or lateral skid condition of the wheels is sensed (step 460) and, should it be determined that the subject wheel continues to excessively slip and/or skid laterally, then the TCS ECU 318 and/or VSA ECU 319 modulates or activates the brakes 316 at each wheel 312 (step 462), further reducing the wheel speed. The slipping and/or lateral skid condition is further monitored (step 464) and the control is applied until excessive slipping and/or lateral skidding is no longer sensed or anticipated.

Figure 9:
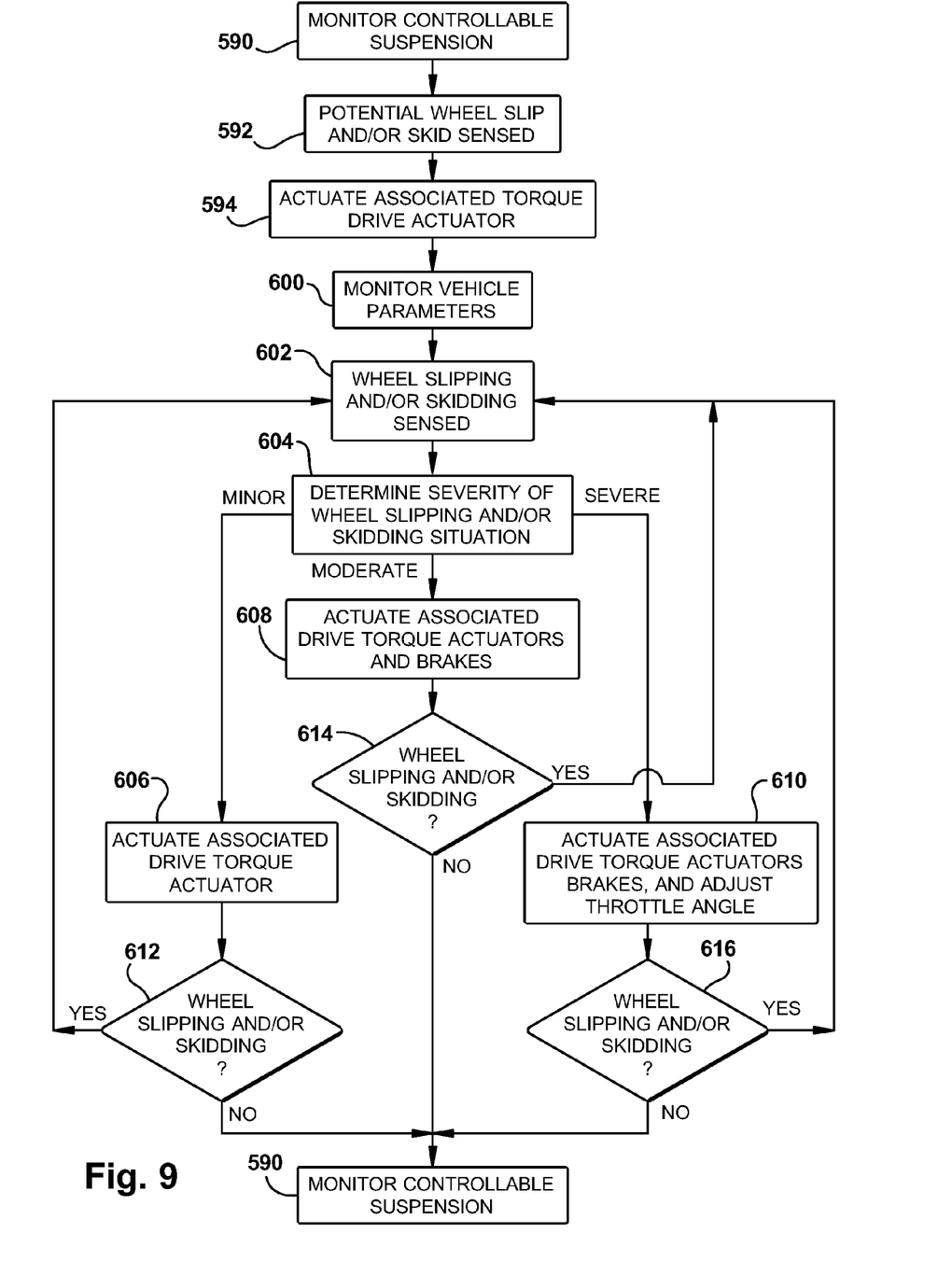
FIG. 9 is a flow chart illustrating operational steps according to a third method of the second embodiments of the present invention.

With reference to FIG. 9, a flow chart illustrating another preferred method of operating the cooperative traction control system 310 according to the second embodiment of the present invention is provided. In this method, the cooperative traction control system 310 provides remedial measures based upon the sensed or calculated severity of the wheel slippage and/or lateral skid.

In step 590, the controllable suspension is monitored and, in step 592, it is determined that potential wheel slipping and/or lateral skidding and/or progression of the vehicle into a region of unstable motion is occurring. Thereafter, in step 594, the TCS ECU 318 and/or VSA ECU 319 communicates the necessary drive torque reduction amount to the drive torque ECU 322, which, in turn, activates the associated drive torque actuator 320 for the wheel that is about to slip and/or skid laterally to reduce the drive torque applied to that wheel.

In step 600, the wheels and/or vehicle motions are monitored and, should excessive wheel slipping and/or lateral skidding be sensed or anticipated (step 602), the TCS ECU 318 and/or VSA ECU 319 determines the severity of the sensed or anticipated wheel slippage and/or lateral skid (step 604). If the wheel slipping and/or lateral skidding situation is determined to be minor in step 604, then the associated drive torque actuator(s) 320 is activated (step 606). If the wheel slipping and/or lateral skidding situation is determined to be moderate in step 604, then the associated drive torque actuator(s) 320 and the brakes are simultaneously activated (step 608). If the wheel slipping and/or lateral skidding situation is determined to be severe in step 604, then simultaneously the associated drive torque actuators 320 are activated, the brakes are activated, and the throttle angle is adjusted to reduce engine torque output (step 610). Naturally, following any of the remedial steps (steps 606, 608, 610) the wheel slipping and/or lateral skidding condition is sensed (steps 612, 614, 616) and, if acceptable slipping and/or lateral skidding is occurring or anticipated, the suspension load is monitored (step 590). If wheel slipping and/or lateral skidding is anticipated, the control returns attempt to prevent excessive slippage and/or lateral skid by adjusting associated drive torque.

In this method, for minor or moderate sensed wheel slipping and/or lateral skidding situations, the engine output torque is maintained, which permits the vehicle handling and speed to be maintained or restored quickly when the excessive slipping and/or lateral skidding conditions are removed. Also, should a minor slipping and/or skidding condition be experienced, then the TCS ECU 318 and/or VSA ECU 319 may respond by only activating the associated drive torque actuator via the drive torque ECU 322. In many cases, this reduction in drive torque at only the slipping and/or laterally skidding wheel will alleviate the slipping and/or laterally skidding problem before a more severe slipping and/or laterally skidding condition is experienced and without detrimentally affecting the performance of the vehicle. Naturally, it is considered apparent that the remedial measures for moderate slipping and/or laterally skidding situations may be adjusted or altered so that, instead of applying the brakes, the throttle angle is adjusted. It is believed that reducing drive torque and adjusting the throttle angle in moderate slipping and/or laterally skidding situations may be preferred in some control strategies.

In accordance with the present invention, enhancements to the brake-based controller now include:
 Ability to calculate the required drive torque reduction amount,
 Ability to send a commanded drive torque reduction amount to an electronically controlled drive torque device (for each controlled wheel),
 Ability to receive status information regarding the execution of the command of the electronically controlled drive torque device; and
 Ability to receive load information from a controllable vehicle suspension and use the information in a feed forward manner to adjust the commanded drive torque reduction amount.

Further, in the present invention the controlled drive torque actuator now has the following responsibilities to respond to the TCS ECU's and/or VSA. ECU's requests:
 Ability to receive a commanded drive torque reduction signal from the TCS ECU and/or VSA ECU via the drive torque ECU,
 Ability to decide the priority of the TCS ECU's and/or VSA ECU's command signal in coordination with other areas of the driving torque control,
 Ability to request and control the required change in drive torque based on the two above actions.

As noted previously, the main operational enhancement of this invention relates to, but is not limited to, operation on low coefficient surfaces during turning and hard acceleration. During vehicle launch on low coefficient surfaces and while turning in particular, there is a higher likelihood of loss of traction and potentially ensuing loss of yaw stability and/or vehicle maneuverability. The present invention, as noted hereinbefore, eliminates or reduces the problems encountered with the prior art systems by controlling drive torque at the slipping and/or laterally skidding wheel, either alone or in combination with other slip-reducing, lateral skid-reducing and stable vehicle motion-enhancing control schemes.

Although the invention has been shown and described with reference to certain preferred and alternate embodiments, the invention is not limited to these specific embodiments. Minor variations and insubstantial differences in the various combinations of materials and methods of application may occur to those of ordinary skill in the art while remaining within the scope of the invention as claimed and equivalents.

What is claimed is:

1. A cooperative traction control system for controlling a vehicle having a plurality of wheels, comprising:
 a plurality of vehicle parameter sensors;
 a plurality of drive torque actuators, each of said drive torque actuators is operatively associated with only one of said wheels, wherein each of said drive torque actuators is operable to only directly adjust a drive torque delivered to said associated one of said wheels; and,
 a controller that receives signals from said vehicle parameter sensors and determines whether any of said plurality of wheels is longitudinally slipping or laterally skidding wherein, when said controller determines, based upon said received signals, that one of said wheels is slipping longitudinally and/or skidding laterally or is expected to slip longitudinally and/or skid laterally and that others of said wheels are not slipping longitudinally and/or skidding laterally or are not expected to slip longitudinally and/or skid laterally, the drive torque actuator associated with said one of said wheels is activated to reduce the drive torque delivered to said associated one of said wheels without reducing the drive torque delivered to said others of said wheels, and wherein said system further comprises an engine electronic control unit that is operable to adjust a throttle angle of said engine, and wherein, when said one of said wheels is slipping longitudinally and/or skidding laterally or is expected to slip longitudinally and/or skid laterally, said engine electronic control unit is activated to adjust the throttle angle to reduce engine torque output, wherein said vehicle parameter sensors are both:
  wheel sensors associated with each of the vehicle wheels, and vehicle motion sensors;

said signals from said vehicle motion sensors are vehicle motion signals and said signals from said vehicle wheel sensors are wheel speed signals; and said controller includes a vehicle stability assist system electronic control unit, a traction control system electronic control unit and a drive torque electronic control unit, said traction control system electronic control unit and a vehicle stability assist system electronic control unit receiving the vehicle motion signals and wheel speed signals and determines whether one of said wheels is slipping longitudinally and/or skidding laterally, and wherein said drive torque electronic control unit controls said drive torque actuators in response to control signals from said traction control system electronic control unit and vehicle stability assist system electronic control unit.

\* \* \* \* \*